US012281782B1

(12) United States Patent
Kliger et al.

(10) Patent No.: US 12,281,782 B1
(45) Date of Patent: Apr. 22, 2025

(54) LOW POWER LED STRIP WITH ALTERNATE DATA PATH

(71) Applicant: Everi Games Inc., Austin, TX (US)

(72) Inventors: Eduard Kliger, Austin, TX (US); Henry McDonald, Leander, TX (US); Nicholas Wittsche, Austin, TX (US)

(73) Assignee: Everi Games, Inc., Austin, TX (US)

( * ) Notice: Subject to any disclaimer, the term of this patent is extended or adjusted under 35 U.S.C. 154(b) by 17 days.

(21) Appl. No.: 18/375,357

(22) Filed: Sep. 29, 2023

(51) Int. Cl.

| | |
|---|---|
| ***F21V 23/00*** | (2015.01) |
| ***G07F 17/32*** | (2006.01) |
| *F21Y 115/10* | (2016.01) |

(52) U.S. Cl.
CPC ........ *F21V 23/007* (2013.01); *G07F 17/3211* (2013.01); *G07F 17/3216* (2013.01); *F21Y 2115/10* (2016.08)

(58) Field of Classification Search
CPC . F21V 23/007; G07F 17/3211; G07F 17/3216
See application file for complete search history.

(56) References Cited

U.S. PATENT DOCUMENTS

| | | | | |
|---|---|---|---|---|
| 2010/0201279 | A1 | 8/2010 | Zhao | |
| 2010/0311494 | A1* | 12/2010 | Miller | A63F 1/18 463/22 |
| 2018/0084625 | A1* | 3/2018 | Niebert | H05B 47/18 |
| 2021/0045221 | A1* | 2/2021 | DeJonge | H05B 47/18 |
| 2021/0112645 | A1* | 4/2021 | Knipp | F21V 33/008 |
| 2024/0119785 | A1* | 4/2024 | McDonald | G07F 17/3216 |
| 2024/0127741 | A1* | 4/2024 | Dorland | G09F 9/33 |

* cited by examiner

*Primary Examiner* — Christopher E Dunay
(74) *Attorney, Agent, or Firm* — Calvert Technology Law, PLLC; Nathan H. Calvert

(57) ABSTRACT

An illumination device includes a first substrate and a plurality of LED drivers arranged in a physical series along the first substrate for driving LED pixels. Each of the LED drivers including a data input and a data output for communicatively coupling the LED drivers. Communication traces are formed along the first substrate and connecting to respective data inputs and data outputs of the LED drivers to electrically arrange the LED drivers into an upstream series comprising a first selected group of the LED drivers and a downstream series comprising the remaining LED drivers, the upstream series and downstream series being interspersed along the physical series. The device may be embodied in an LED strip or more generally an LED panel.

15 Claims, 8 Drawing Sheets

LOW POWER LED STRIP WITH ALTERNATE DATA PATH

TECHNICAL FIELD OF THE INVENTION

The invention relates to LED strips and panels, and their use in gaming machines.

BACKGROUND

Gaming machines, such as slot machines deployed in a casino floor, often use LED strips or panels to provide accent lighting effects. One challenge in designing such systems is the distribution of power to a large number of LEDs on an LED strip. Typically, LED driver chips are arranged in a series with power rails delivering a supply voltage along the series. As the series gets longer, in physical length or number of LEDs, the supply voltage tends to drop due to the physical length of the supply rails, and power drawn by the LEDs along the length of the series. This effect tends to limit the physical size and number of LEDs that can be powered with a particular supply voltage.

In many existing LED strip design, a common approach to overcome voltage drop is to use higher voltages such as 12 V or 24 V. However, this solution comes with certain drawbacks. First, it requires LED drivers that can handle the higher voltages, or the addition of voltage reduction components like Zener diodes. These modifications introduce complexity and potential compatibility issues. Furthermore, operating the LED strip at higher voltages often necessitates connecting multiple LEDs in series, leading to increased power wastage and a reduction in strip resolution.

Another limitation of current LED strip designs is the absence of an incorporated actively driven data return path. When a return data path is needed, it often requires the use of external wires, or a single trace spanning the entire length of the strip. Both of these approaches can lead to data corruption issues and restrict the maximum length of chained LED strips.

There exists a need to improve LED strip design to provide lower power and greater configurability for making upgrades such as adding internal or external lighting panels, or increasing the density of LEDs in a lighting panel. There also exists a need to reduce the power consumption of LED strips.

SUMMARY

An illumination device includes a first substrate and a plurality of LED drivers arranged in a physical series along the first substrate for driving LED pixels. Each of the LED drivers including a data input and a data output for communicatively coupling the LED drivers. Communication traces are formed along the first substrate and connecting to respective data inputs and data outputs of the LED drivers to electrically arrange the LED drivers into an upstream series comprising a first selected group of the LED drivers and a downstream series comprising the remaining LED drivers, the upstream series and downstream series being interspersed along the physical series. The device may be embodied in an LED strip or LED panel.

According to another aspect of the invention, a light panel is adapted to be coupled to a gaming machine cabinet. The light panel includes a light panel housing and an accent light assembly. The accent light assembly is positioned along the light panel housing and comprising a plurality of LED panels. The LED panels include a first substrate and a plurality of LED drivers arranged in a physical series along the first substrate and coupled to drive a plurality of respective LED pixels, each of the LED drivers including a data input and a data output for communicatively coupling the LED drivers. Communication traces are formed along the first substrate and connecting to respective data inputs and data outputs of the LED drivers to electrically arrange the LED drivers into an upstream series comprising a first selected group of the LED drivers and a downstream series comprising the remaining LED drivers, the upstream series and downstream series being interspersed along the physical series.

According to another aspect of the invention, an accent light controller adapted to be installed in a gaming machine and includes a data communication interface adapted to connect to a communication channel, and an electronic controller coupled to communicate through said data communication interface with a plurality of LED panels arranged in series at an external lighting panel. The electronic controller is programmed to transmit signals to LED drivers of the LED panels and receive a loop-back signal transmitted from a final one of series of LED panels. Based on timing of said received loop-back signal, the electronic controller determines a number of led drivers in the led panels, and based on said number of led drivers, identifies a configuration of the led panels from a number of possible configurations. The electronic controller then transmits commands for activating the LED drivers of the LED panels based on the identified configuration.

According to various embodiments of the above aspects, lighting sequence information may be received at the accent lighting controller for synchronizing a lighting sequence of the LED panels with a lighting sequence of lights mounted in the gaming machine. Determining a number of LED drivers in the LED panels may include determining a number of data clock cycles for the command to pass through the series of LED panels and the indicator to return back to the controller. Identifying a configuration of the LED panels may include comparing the number of LED drivers in the LED panels to a set of stored configuration data for multiple different LED panel configurations. The indicator transmitted back to the electronic controller may be the command received at the final LED driver.

DESCRIPTION OF REPRESENTATIVE EMBODIMENTS

Figure 1:
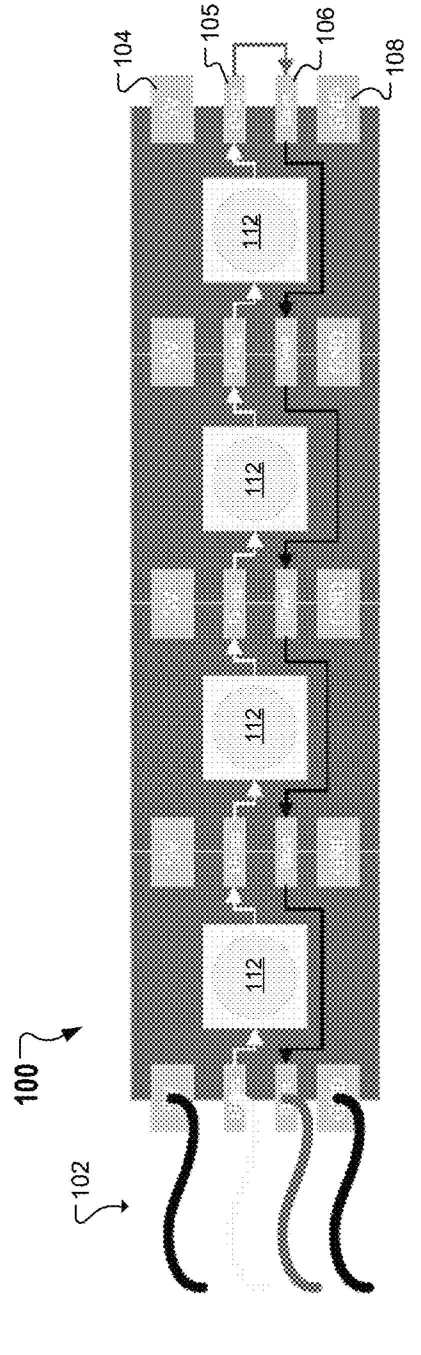
FIG. 1 (Prior Art)
FIG. 1 is a block diagram showing a signaling path for an LED strip according to the prior art.

FIG. 1 is a block diagram showing a signaling path for an LED strip 100 according to the prior art. The depicted LED strip 100 includes a series of only four LED pixels for illustration purposes, but is typically much longer. A group of electrical connections 102 are shown as waving lines to indicate wired connections or other electrical connections such as an electrical socket used to provide power and signaling to LED strip 100. Each of the four LED pixels is included in a schematic cell with labelled boxes representing the electrical connections that enter and leave each schematic cell including a 5 V voltage supply connection 104 labelled "5 V", an upstream data connection 105, labelled "D-up", a return data connection 106, labelled "Dret", and a voltage supply ground 108, labelled "GND". These connections provide power and control signaling to the depicted LED drivers 112.

In the signaling scheme depicted by the connection arrows on the diagram, the upstream data connection D-up is connected by electrical trace to the data input of each LED driver 112, and then the data output of the LED driver 112 is connected to the "D-Up" input for the next LED pixel in the series. As such, the depicted physical series of LED drivers 112 is also the arrangement of their electrical series for control signaling. Each LED driver 112 is addressable using data in the control signal, and forwards the control signal to the next LED driver 112 in the series by outputting it at the data output. This arrangement is common for such LED driver chips as the popular WS2811 and WS2812 chips. A return data path, if used, is formed by connecting the upstream data connection 105 for the final LED driver 112 of the series to the return data connection 106 for the same LED driver. The return data connections are all connected directly to each other as depicted by the arrows.

The return data connection may be used to measure signal timing, such as for the automatic configuration schemes discussed herein, or to forward control signals to another strip that is not physically connected at the end of the series. One limitation of such an LED strip design is the absence of an incorporated actively driven data return path. The entire return data path is passive, and may be implemented in various alternatives with external wires or a single trace spanning the entire length of the strip. Both approaches can lead to data corruption issues because of the limited strength of the digital logic driving the data signal out of the LED driver. This phenomenon also restricts the maximum length of wire or trace path that can be utilized in a chained series of LED strips.

Figure 2:
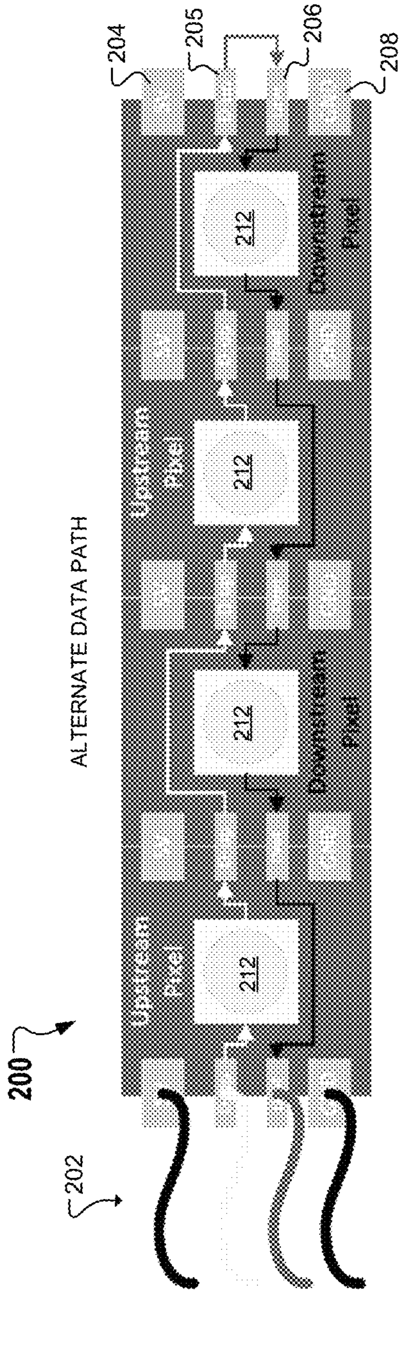
FIG. 2 is a block diagram showing a signaling path for an LED strip according to some embodiments.

FIG. 2 is a block diagram showing a signaling path for an LED strip 200 according to some embodiments. LED strip 200 includes only four LED pixels for illustration purposes, but is typically much longer. A group of electrical connections 202 are shown as waving lines to indicate wired connections or other electrical connections such as an electrical socket used to provide power and signaling to LED strip 100. Each of the four LED pixels is included in a schematic cell with labelled boxes representing the electrical connections that enter and leave each schematic cell including a 5 V voltage supply connection 204 labelled "5 V", an upstream data connection 205, labelled "D-up", a return data connection 206, labelled "Dret", and a voltage supply ground 208, labelled "GND". These connections provide power and control signaling to the depicted LED drivers 212.

LED strip 200 is formed on a substrate such as a circuit board or a flexible circuit board. LED drivers 212 are arranged in a physical series along the substrate and coupled to drive a plurality of respective LED pixels. The pixels may be combined in a chip package with the driver, or separated, and generally include red, green, and blue LEDs. Other embodiments may include single color pixels or other combinations. Each of the LED drivers 212 including a data input and a data output for communicatively coupling the LED drivers.

Formed along the substrate are communication traces which connect to respective data inputs and data outputs of the LED drivers 212 to electrically arrange them into an upstream series comprising a first selected group of the LED drivers, each labeled "Upstream Pixel", and a downstream series comprising the remaining LED drivers, each labeled "Downstream Pixel". The upstream series and downstream series are interspersed along the physical series. This arrangement provides that the control signal is re-driven regularly in both directions along the physical series, overcoming signal attenuation problems with overly-long signal paths and the accompanying capacitive coupling to the environment. The control signal is fed to each data input and re-driven from each data output of LED drivers 212. A signal re-shaping amplification driver is preferably used in each LED driver 212 to ensure waveform distortion does not accumulate as the control signal is passed along. Each LED driver 212 may strip out the control bits associated with its address, for example as performed in the WS2811 LED driver chip.

In this embodiment, the physical series is a row, and the upstream series and downstream series are interspersed by being alternated one-by-one along the row. In other embodiments, the series may be interspersed differently. For example, the upstream pixels and downstream pixels may appear in adjacent groups of another size such as two or three. In other embodiments, the group sizes may be different, such as one downstream pixel for every two upstream pixels. In some embodiments, the upstream series and downstream series are interspersed such that no communication trace connecting a data output of one of the LED drivers to a data input of another one of the LED drivers is longer than a designated length such as 25 cm, 50 cm, or 100 cm, for example.

Following the ends of the row or physical series, connection terminals or pads are provided for attaching wires or coupling to appropriate electrical connectors. LED strip 200 includes a proximal upstream terminal pad "D-up" on the substrate for connecting an upstream data signal onto the substrate, and a distal upstream terminal pad "D-up" on the substrate for connecting the upstream signal off of the substrate. LED strip 200 also includes a proximal downstream terminal pad "Dret" on the substrate for connecting a downstream data signal off of the first substrate, and a distal downstream terminal pad "Dret" on the substrate for connecting the downstream signal onto the first substrate. The two distal terminal pads may be used to connect multiple LED strips 200 in series. For the final LED strip in such a series, the distal terminal pads are connected together, either by an external connector, by loopback connection logic, or by a permanent trace on the substrate.

Figure 3A:
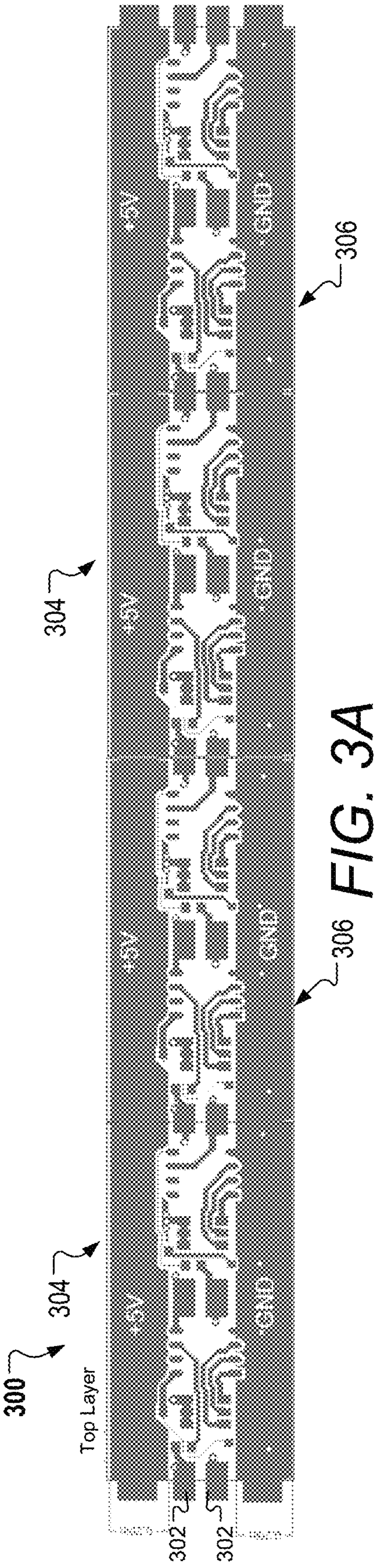
FIG. 3A shows a plan view 300 of top layer circuit board layout for an LED strip according to one embodiment.
Figure 3B:
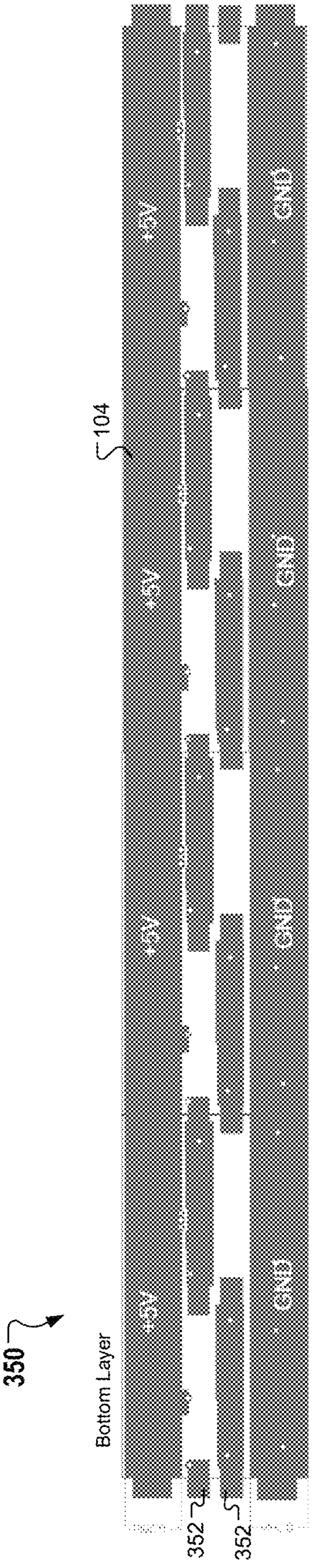
FIG. 3B shows a plan view 350 of a bottom layer circuit board for the same LED strip.

FIG. 3A shows a plan view 300 of top layer circuit board layout for an LED strip according to one embodiment. FIG. 3B shows a plan view 350 of a bottom layer circuit board for the same LED strip. Depicted are the power supply traces for a positive voltage rail, labeled "+5 V" and a negative voltage rail, labeled "GND", both formed along the substrate such a circuit board or flexible circuit board. Traces and vias for forming circuit board circuitry of cells two upstream pixels 304 and two downstream pixels 306 are shown. Top layer proximal terminal pads 302 and bottom layer proximal terminal pads 352 are shown on the left. As can be seen in the layout, in this embodiment, similar terminal pads are present between each pixel cell to provide "cut pads" that allow an LED strip to be cut to a desired length, and distal pads are present for connecting additional LED strips in series, if desired.

In preferred embodiments, the copper layers are formed of at least 3 oz-rated copper traces having a width of at least 0.2 inches. While a typical LED strip uses a much thinner copper layer, by employing thicker 3 oz copper layers with a widened power planes that increase the cross-section of copper carrying power to the LED strip, the design minimizes voltage drop issues. This helps eliminates the need for higher operational voltages, LED drivers with specific voltage requirements, or additional voltage reduction components such Zener diodes when using high numbers (hundreds) of LED drivers in an LED strip or series of LED strips. Test measurements on a 170-pixel strip with 16.3 mm LED spacing experiences an overall voltage drop of only 0.9 V, resulting in an average voltage drop of just 5.3 mV per pixel using the depicted design with the circuit arrangement described above. This low voltage drop allows for increased strip length and resolution without color drifting. Additionally, the improved voltage drop enables the use of 5 V power supplies and facilitates the connection of a single LED per driver, further enhancing strip resolution.

Figure 4:
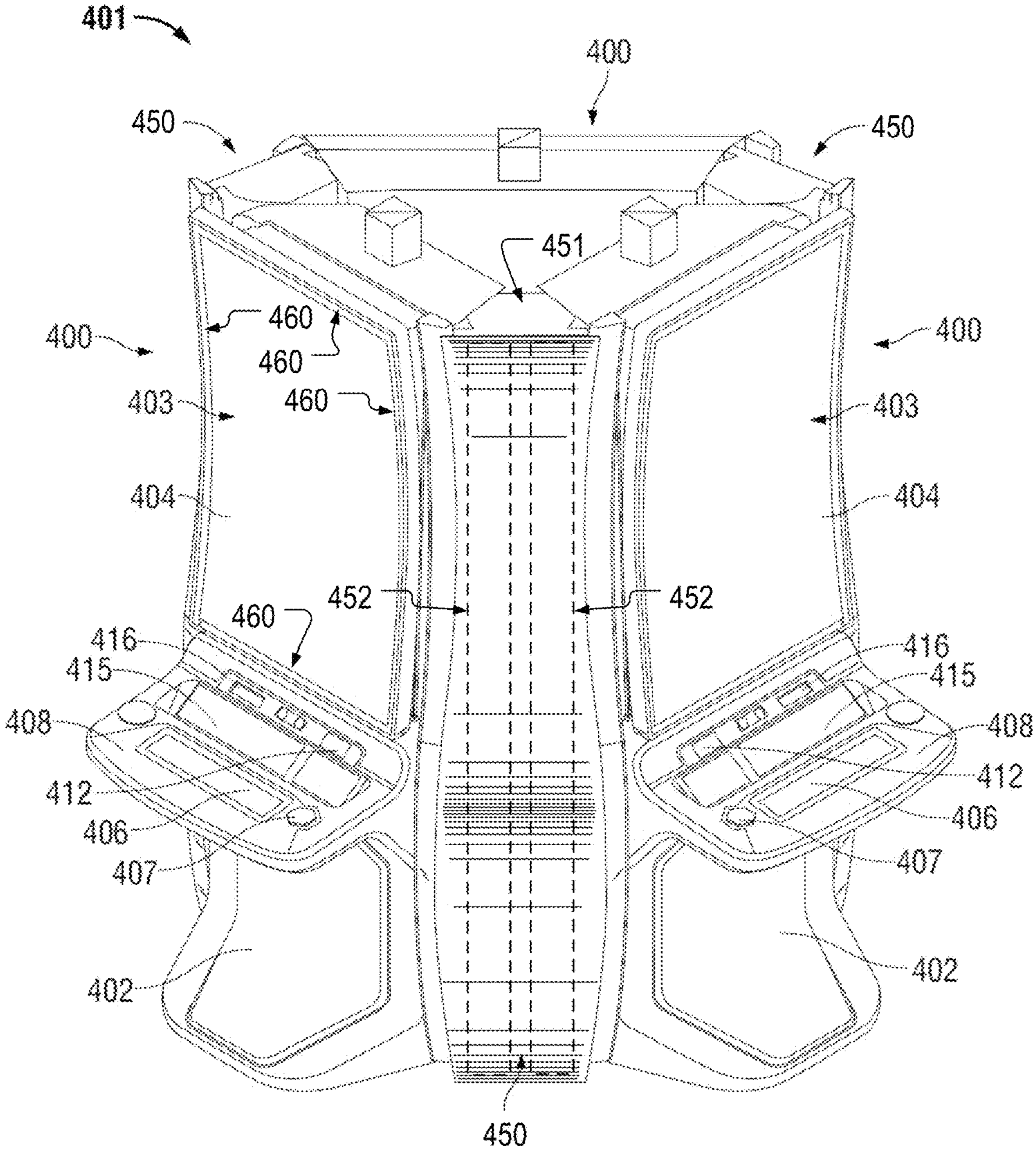
FIG. 4 is a perspective view of a gaming machine installation including a respective light panel connected between each gaming machine in the installation.

By combining these circuit board features with the upstream and downstream pixel series discussed with respect to FIG. 2, LED strip 200 is able to achieve a highly efficient and reliable power for achieving increased pixel density, longer strip lengths, and improved data transmission for control signals. For example, the circuit of LED strip 200 may be used in gaming machines to achieve these goals for providing lighting effects on a gaming machine or lighting panels for a gaming machine. In some embodiments, a light panel may include multiple LED strips 200 positioned side by side, or in another arrangement. In other embodiments, a light panel may include a single circuit board with multiple circuits FIG. 4 shows a gaming machine installation 401 including three gaming machines 400 connected so that the gaming machines face outwardly in a triangular arrangement. In this installation a light panel 450 is positioned in an operating position between each gaming machine 400 in position to provide lighting effects between the two adjacent gaming machines.

Figure 5:
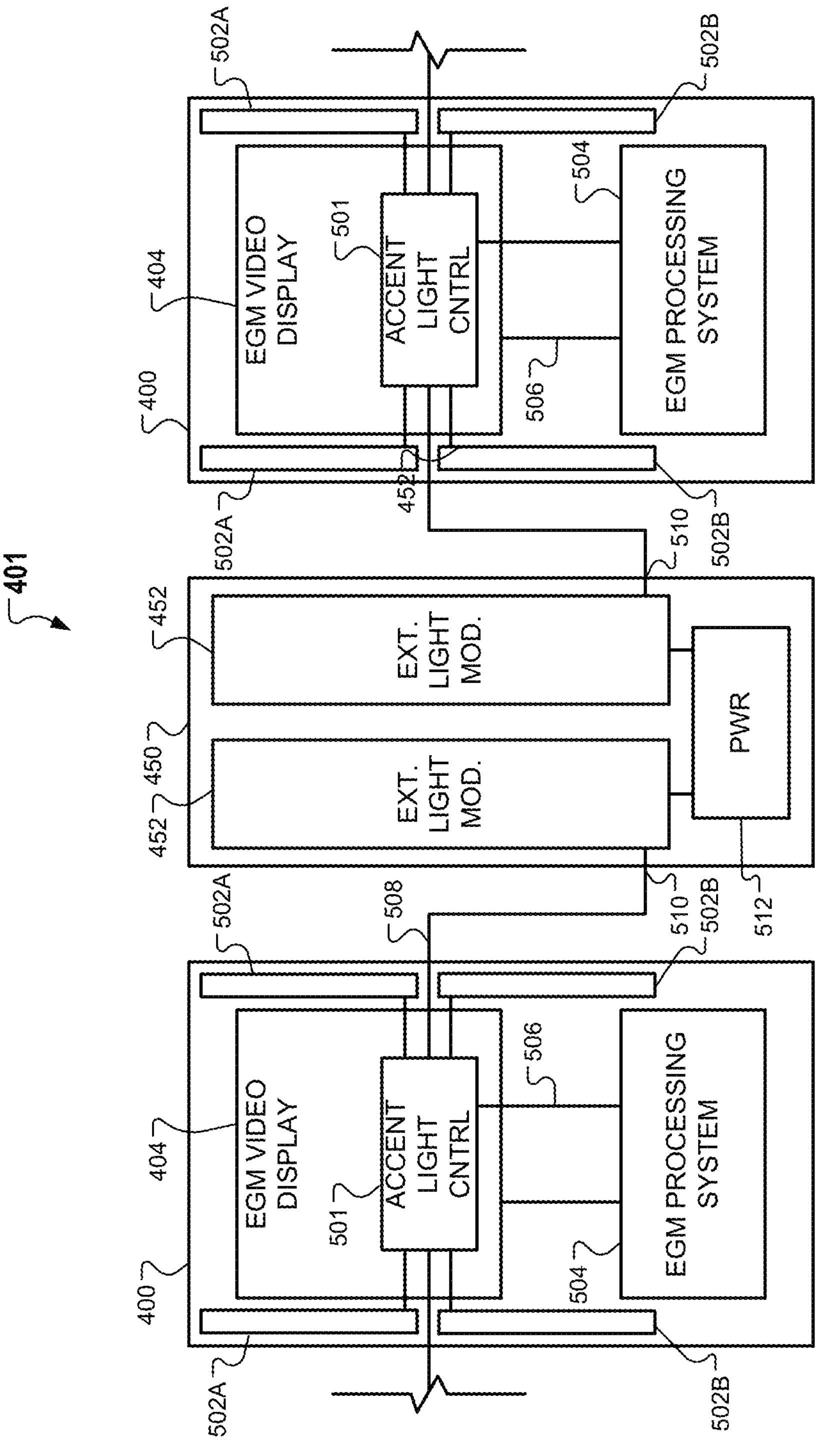
FIG. 5 is a block diagram of a light panel operatively connected between two adjacent gaming machines in a gaming machine installation.

Each gaming machine 400 ("electronic gaming machine", "EGM") in FIG. 4 includes a cabinet 402 having a front side generally shown at reference numeral 403. A primary video display device 404 is mounted in a central portion of the front side 403, and a touch-screen button panel 406 is positioned below the primary video display device. Along the edges of display device 404 are one or more accent light devices including one or more LED strips 460, which are typically integrated behind bezels positioned along the left, right, top, and bottom of display device 404. LED strips 460 are constructed as discussed above, and may be connected in series and controlled with a single control channel, or each controlled with a separate control channel by an accent light controller (FIG. 5).

Gaming machine 400 may include additional smaller auxiliary display devices (not shown) in the area shown generally at 408. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 404, may be used to display graphics associated with a reel-type game and bonus game portion in accordance with aspects of the present invention. It is also possible for gaming machines within the scope of the present invention to include mechanical elements such as mechanical reels. Generally, the display device or display devices of the gaming machine, through which games may be presented may be referred to in this disclosure and the accompanying claims as a "display system" regardless of whether the display arrangement includes video displays, physical reels, or combinations of the two.

Each gaming machine 400 illustrated for purposes of example in FIG. 4 also includes a mechanical control button 407 mounted adjacent to touch-screen button panel 406. This control button 407 may allow a player to make a play input to start a play in a wagering game conducted through gaming machine 400, while virtual buttons included (but not shown in this view) on button panel 406 or other physical buttons or controls (not shown) may allow a player to select a bet level for a game implemented at the gaming machine and select a type of game or game feature. Touch-screen button panel 406 may also be used in implementations of reel-type games encompassing aspects of the invention to allow the player to control a cursor that may be displayed on another display device. Other forms of gaming machines through which the invention may be implemented may include switches, joysticks, or other mechanical input devices, in addition to the virtual buttons and other controls implemented on touch-screen button panel 406. For example, primary video display device 404 in gaming machine 400 provides a convenient display device for implementing touch screen controls in addition to or in lieu of controls included on touch-screen button panel 406 or mechanical controls. The player interface devices which receive player inputs in the course of a game played through the gaming machine, such as controls to select a wager amount for a given play, controls to enter a play input to actually start a given play in the wagering game, or controls to allow a player to make other player inputs in a game according to the present invention, may be referred to generally as a "player input system."

It will be appreciated that gaming machines may also include a number of other player interface devices in addition to devices that are considered player controls for use in entering inputs in the course of a particular game. Gaming machine 400 also includes a currency/voucher acceptor having an input ramp 412, a voucher/receipt printer having a voucher/receipt output 415, and a player card reader (not shown in the view of FIG. 4). Numerous other types of player interface devices may be included in gaming machines that may be used to implement embodiments of the present invention.

Gaming machine 400 may also include a sound system to provide an audio output to enhance the user's playing experience. For example, illustrated gaming machine 400 includes speakers behind grille 416 which may be driven by a suitable audio amplifier (not shown) to provide a desired audio output at the gaming machine.

Light panel 450 includes a light panel front cover generally indicated at 450 and a light panel housing 451 which supports the light panel front cover in an operating position. As shown by the dashed boxes in FIG. 4, light panel 450 includes two accent light columns 452 (which may also be referred to as "external light modules") extending side-by-side. These two accent light columns 452 are housed within light panel housing 451 and can be controlled by the adjacent gaming machines in to provide various backlighting effects visible through the light panel front cover. The two accent light columns 452 are shown in dashed lines in FIG. 2 to reflect the fact that they are located in this view behind light panel front cover and housed within the light panel housing.

FIG. 5 shows a block diagram of a portion of the gaming machine installation 401 shown in FIG. 4. In particular FIG. 5 shows a block diagram of a light panel 450 installed between two gaming machines 400, each including a video display 404. The block diagram of FIG. 5 also shows that each gaming machine 400 includes a processing system 504 and accent light controller 501, and one or more upper accent light devices 502A and lower accent light devices 502B mounted on the gaming machine cabinet.

Typically, upper accent light devices 502A are positioned at the front face of the gaming machine cabinet at each side and extending from the top down to the button deck, while lower accent light devices 502B are positioned at the front face, again toward each side, and extend from under the button deck down toward the bottom of the gaming machine cabinet. Accent light devices 502A and 502B may be positioned at the side face of a gaming machine cabinet in some embodiments. Accent light devices 502A and 502B each include one or more LED strips 200 (FIG. 2).

Accent light controller 501 comprises a controller which receives signals preferably over serial signal path 506 and, in response to those signals from the gaming machine processing system, produces signals to control the accent light devices 502A and 502B of the gaming machine. FIG. 5 shows the accent light controller 501 is included with the video display 404, but other implementations may include the accent light controller separately from the display device. In any event, in accordance with the present invention, accent light controller 501 also provides a control signal along path 508 to a control signal input port 510 of the light panel 450. The signal applied to input port 510 is communicated along a suitable signal path in the light panel 450 to the respective accent light column 452 which in the example of FIG. 5 is labelled "EXT.LIGHT MOD." for external light module. FIG. 5 also shows a power supply 512 associated with light panel 450 for providing operating power to the light columns/external light modules 452.

Each light column 452 included in panel 450 is controlled by a different one of the gaming machines 400 through a respective control signal line in 508 and input port 510. In particular, a gaming machine 400 on the right hand side of panel 450 controls the light column 452 on the right hand side of panel 450 in FIG. 5 while the gaming machine 400 on the left-hand side of panel 450 controls the left-hand light column of panel 450. The control signals may be the same control signals used to control the EGM-mounted accent lights 502A and 502B so that they operate in coordination with the lights included in the adjacent column 452 of the light panel 450.

Figure 6:
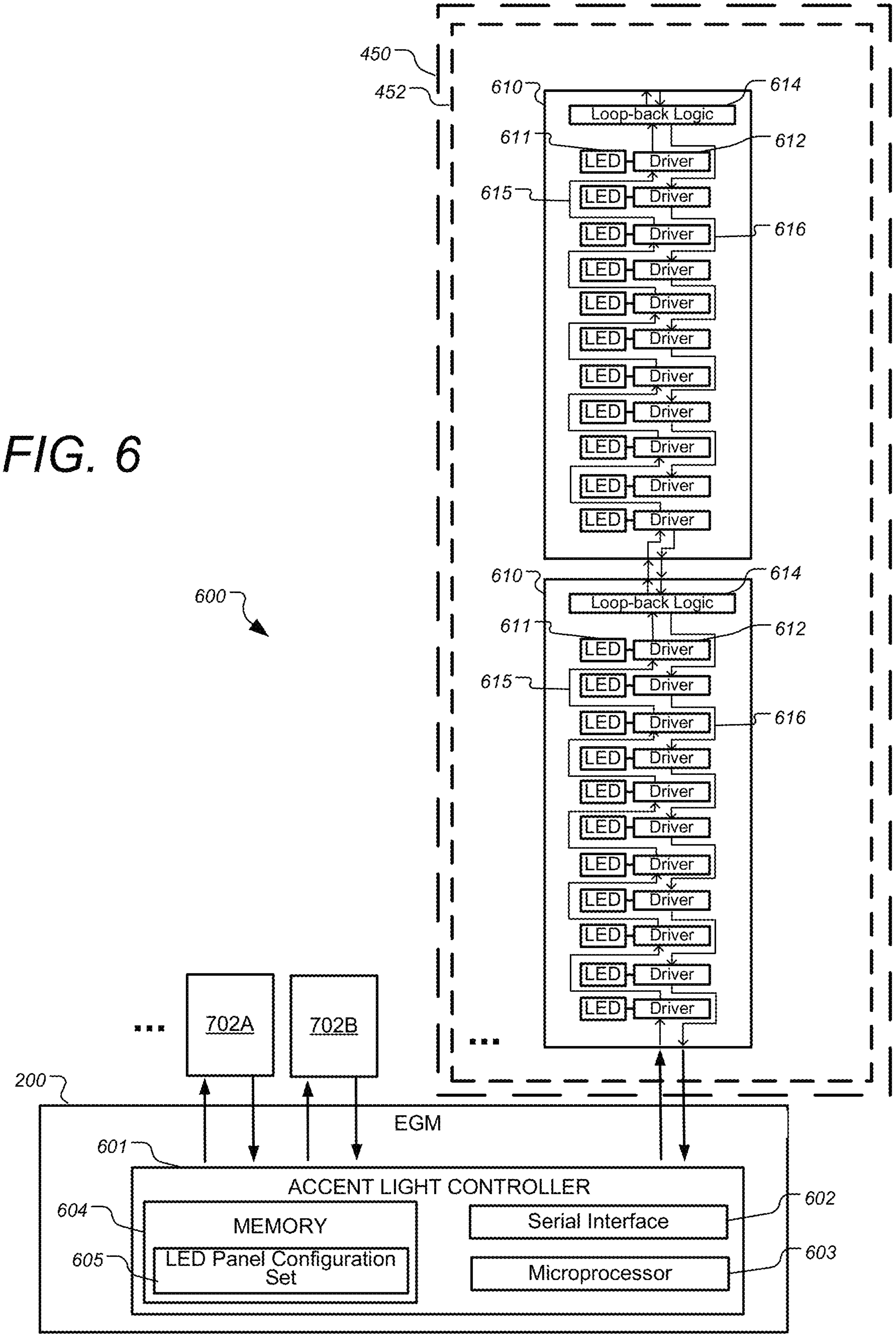
FIG. 6 is a block diagram showing an accent lighting system according to one embodiment.

FIG. 6 is a block diagram showing an accent lighting system 600 according to one embodiment. The system 600 is employed with an EGM such as those described herein. Accent light controller 601 is installed in EGM and communicates with a plurality of LED panels 610 which are arranged in series as depicted at an external lighting panel 450. For example, LED panels 610 may be combined to form a light panel 450 of light column 452 (FIG. 5), as indicated by the dotted boxes 450 and 452. A light panel 450 as described herein may be reconfigurable with different numbers of LED panels 610 installed to provide a different height, width, coloring, or density of lighting along one or more of its light columns 452. A particular light panel 450 may be replaced with another light panel 450 of a different size with a different array of LEDs. As indicated by the ellipsis, more than one such light panel 450 may be used with an accent light controller 601. Accent light controller 601 has the capability to automatically recognize when a light panel or light column is changed in the field and reconfigure itself to control the new arrangement of LED panels, as further described below.

Accent light controller 601 includes a data communication interface such as serial interface 602 adapted to connect to a communication channel to communicate with LED panels 610. Accent light controller 601 also includes an electronic controller such as microprocessor 603 which is connected to communicate through serial interface 602. Memory 604 is a tangible, non-transitory memory such as flash memory holding software with which microprocessor 603 is booted and configured. Stored in memory 604 is an LED panel configuration set 605 including data needed to recognize LED panels 610 and configure accent light controller 601 to command and control LED panels 610 in various configurations. The operation of accent light controller 601 will be further described below with respect to FIG. 12 and FIG. 13.

A series of LED panels 610 is shown each including LEDs 611, LED drivers 612 and loop-back logic 614. Each LED panel 610 is adapted for mounting along a light panel front cover in an operating position as described above. LED panels 610 are formed using the circuit design of FIG. 2, including a physical series of LEDs and drivers, electrically arranged into an upstream series and a downstream series for control signaling as discussed with respect to FIG. 2. Each LED driver 612 is coupled to drive a respective LED or set of LEDs 611, which produce the lighting effects. A loop-back control logic circuit 614 is operable to determine if the LED panel is the final LED panel in a series of LED panels, and if so transmit an indicator back through the series of LED panels to an external controller when a command is received at a final one of the LED drivers on the final LED panel. Each loop-back logic circuit has outgoing and incoming serial links in both directions as depicted, is configurable to either forward commands in both directions if it is not on the final LED panel in the series, or loop back commands if it is, as further described below.

While LED panels 610 are shown positioned in an external light panel 450 in this embodiment, LED panels 610 in various configurations are also employed in one or more of each of accent light devices 502A and 502B in other embodiments, which are coupled to the accent light controller similarly to external light panel 450 allowing configuration and reconfiguration of accent lights in the gaming cabinet and external to the gaming cabinet as further described below. As indicated by the ellipsis, more than one accent light device 502A or 502B are typically used with an accent light controller 601 in various embodiments.

Figure 7:
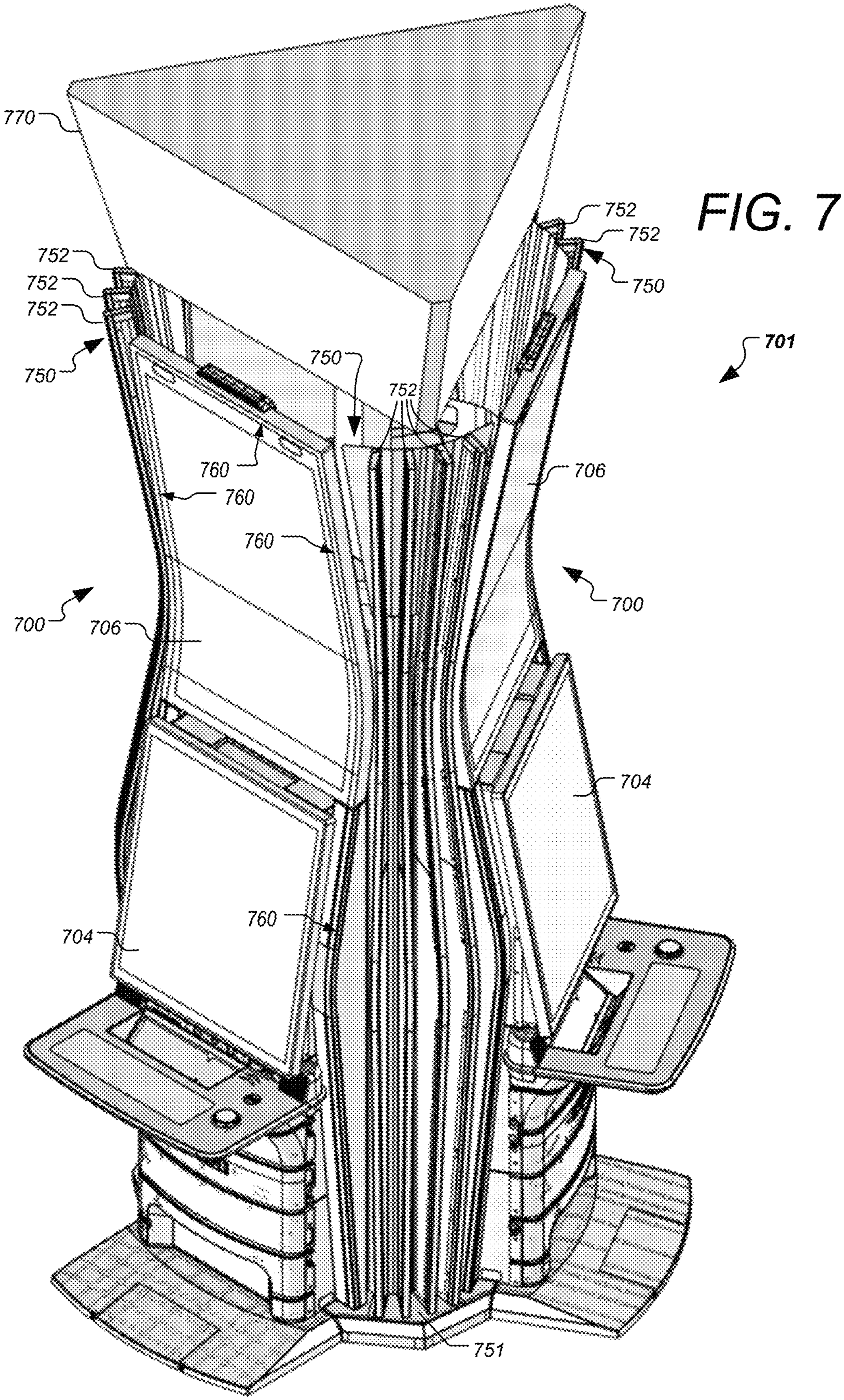
FIG. 7 is a perspective view of a gaming machine installation including a respective light strip panel connected between each gaming machine in the installation.

FIG. 7 shows a gaming machine installation 701 including three gaming machines 700 connected so that the gaming machines face outwardly in a triangular arrangement. In this installation a light panel 750 is positioned in an operating position between each gaming machine 700 in position to provide lighting effects between the two adjacent gaming machines.

Each gaming machine 700 includes a cabinet a primary video display device 704 and a secondary video display device 706. Along the edges of display device 706 are one or more accent light devices including one or more LED strips 760, which are typically integrated behind bezels positioned along the left, right, top of display device 706. LED strips 760 are also mounted beside each primary display 704 in a shape matching the curve of the LED strips on light panels 750. LED strips 760 are constructed as discussed above, and may be connected in series and controlled with a single control channel, or each controlled with a separate control channel by an accent light controller (FIG. 5).

Light panel 750 includes a body or housing 751 with four fin structures 752 projecting therefrom and extending side-by-side in a diverging arrangement to provide a "fanning out" effect of the fin structures as the light panel curves around the corner between gaming machines 700. Each fin structure 752 includes an LED strip integrated along its distal end and outwardly facing, presenting a lighted front edge to the fin structure along its entire height. These LED strips can be controlled by the adjacent gaming machines in to provide various lighting effects, and together with their connecting circuitry form an accent light assembly. LED strips 760 and those on fin structures 752 are preferably constructed as described above with respect to FIGS. 2, 3A, and 3B, and may also be coupled in series and controlled as described with respect to FIG. 6.

An overhead display assembly 770 is installed at the top of gaming machine installation 701 presenting a respective overhead display screen above each gaming machine 700, the display screens arranged in the depicted triangular configuration. Gaming machines 700 also include a button panel interface constructed similarly to that of FIG. 4. It will be appreciated that gaming machines may also include a number of other player interface devices such as a currency/voucher acceptor, a voucher/receipt printer, and a player card reader. Numerous other types of player interface devices may be included in gaming machines that may be used to implement embodiments of the present invention, including an audio system as described with respect to FIG. 4.

Figure 8:
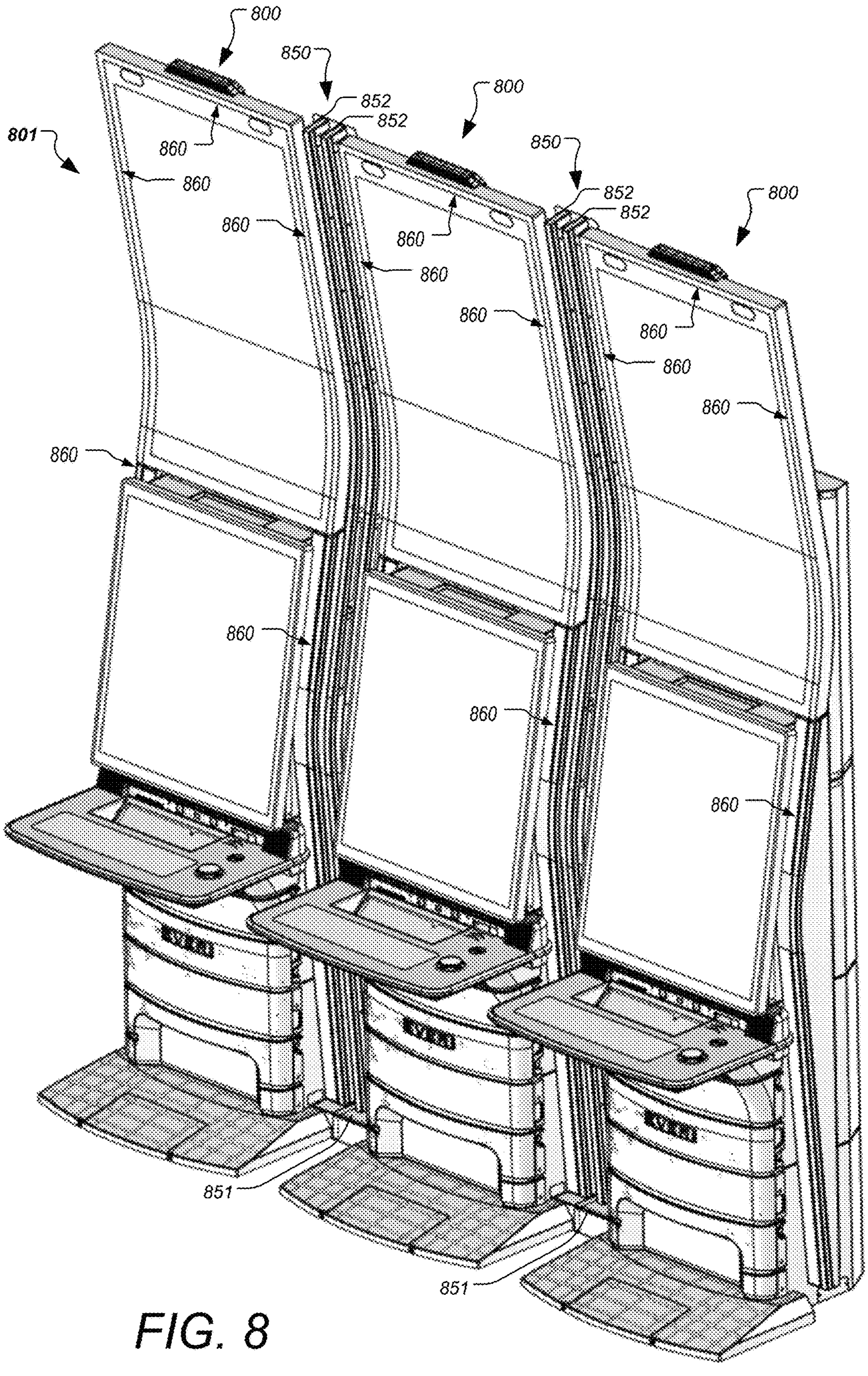
FIG. 8 is a perspective view of another gaming machine installation including a respective light strip panel connected between each gaming machine in the installation.

FIG. 8 shows another gaming machine installation 801 including three gaming machines 800 connected so that the gaming machines face the same direction in a side-by-side arrangement. In this installation a light panel 850 is positioned in an operating position between each gaming machine 800 in position to provide lighting effects between the two adjacent gaming machines.

Each gaming machine 800 includes a cabinet a primary video display device 804 and a secondary video display device 806. Along the edges of display device 806 are one or more accent light devices including one or more LED strips 860, which are typically integrated behind bezels positioned along the left, right, top of display device 806. LED strips 860 are also mounted beside each primary display 804 in a shape matching the curve of the LED strips on light panels 850. LED strips 860 are constructed as discussed above, and may be connected in series and controlled with a single control channel, or each controlled with a separate control channel by an accent light controller (FIG. 5).

Light panel 850 includes a body or housing 851 with two fin structures 852 projecting therefrom and extending side-by-side straight outward along the front facing direction of gaming machines 800. Each fin structure 852 includes an LED strip integrated along its distal end and outwardly facing, presenting a lighted front edge to the fin structure along its entire height. These LED strips can be controlled by the adjacent gaming machines in to provide various lighting effects, and together with their connecting circuitry form an accent light assembly. LED strips 860 and those on fin structures 852 are preferably constructed as described above with respect to FIGS. 2, 3A, and 3B, and may also be coupled in series and controlled as described with respect to FIG. 6.

Gaming machines 800 also include a button panel interface constructed similarly to that of FIG. 4. It will be appreciated that gaming machines may also include a number of other player interface devices such as a currency/voucher acceptor, a voucher/receipt printer, and a player card reader. Numerous other types of player interface devices may be included in gaming machines that may be used to implement embodiments of the present invention, including an audio system as described with respect to FIG. 4.

Figure 9:
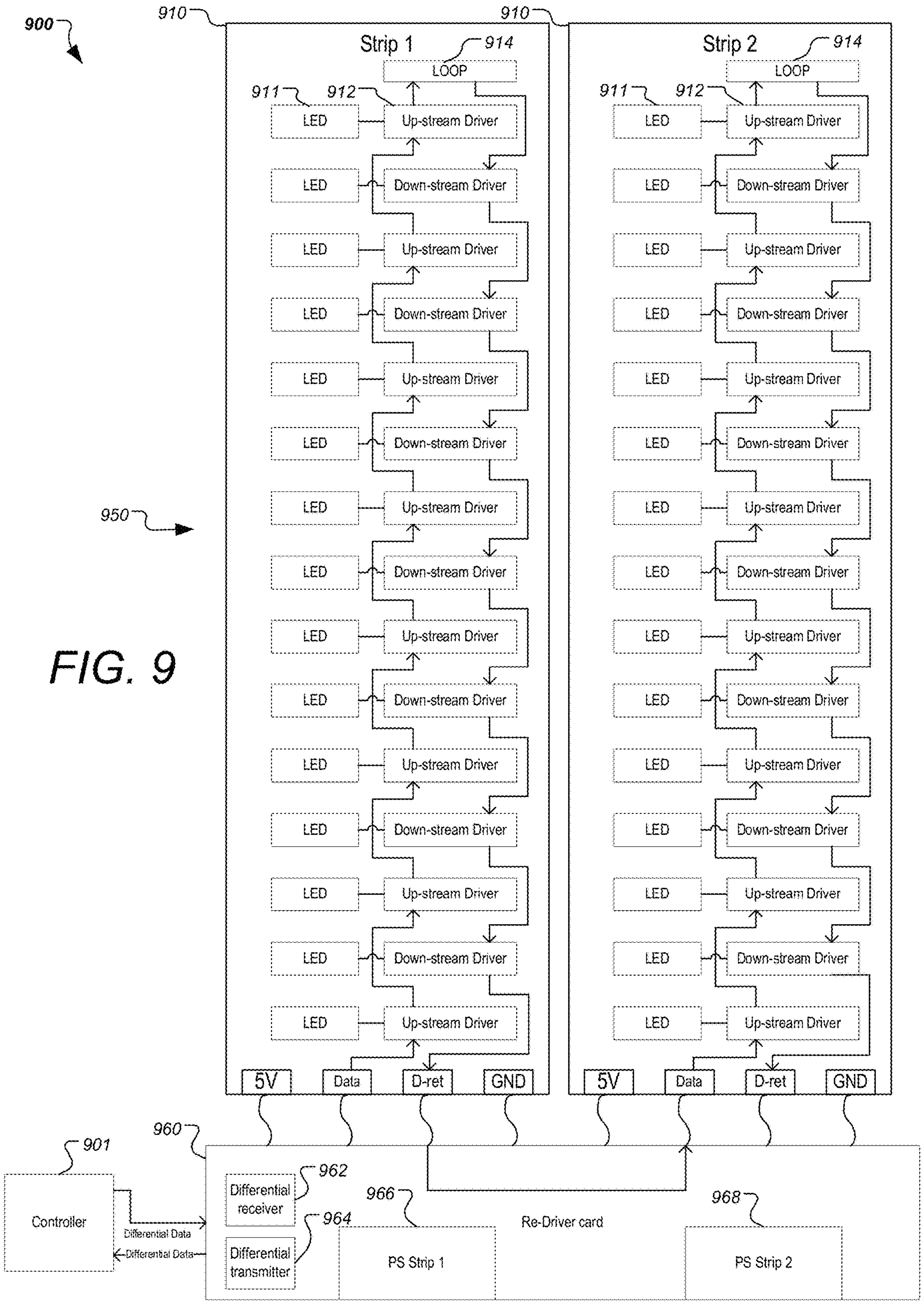
FIG. 9 is a block diagram showing an accent lighting system 900 according to another embodiment.

FIG. 9 is a block diagram showing an accent lighting system 900 according to another embodiment. System 900 is employed with an EGM or group of EGMs using lighting strips such as those described with respect to FIG. 8 and FIG. 9. System 900 includes an accent light controller 901, one or more light panels 950, and one or more re-driver cards 960. Accent light controller 901 is installed in an EGM and communicates with a plurality of LED strips 910 which are may be arranged in series as depicted at external lighting panel 950, or attached to the EGM as depicted in FIGS. 7 and 8, or both. A light panel 950 as described herein may be reconfigurable with different numbers of LED strips 910 installed to provide a different height, width, coloring, or density of lighting along one or more of its LED strips 910. While in this embodiment two LED strips 910 are shown, labelled "Strip 1" and "Strip 2", in other embodiments more LED strips may be used. More than one such light panel 950 may be used with an accent light controller 901. Re-driver card 960 is adapted for redriving a data signal to control multiple LED strips arranged in an electrical series on the same controller channel. Accent light controller 901 has the capability to automatically recognize when a light panel or light column is changed in the field and reconfigure itself to control the new arrangement of LED panels, as further described below.

Accent light controller 901 includes a data communication interface such as the serial interface described above, adapted to connect to communication channels to communicate with LED panels 910. Accent light controller 901 also includes an electronic controller such as microprocessor 903 which is connected to communicate through the serial interface. Stored in memory 904 is an LED panel configuration set 905 including data needed to recognize LED strips 910 and configure accent light controller 901 to command and control LED strips 910 in various configurations.

Re-driver card 960 includes a differential receiver 962, a differential transmitter 964, a pair of power supplies 966 and 968, and various electrical traces or wiring and connectors, not shown separately, for implementing electrical connections for the power supplies and signal connections to enable operation of LED strips 910. In the depicted version, the data return connection of Strip 1, labelled "D-ret", is connected to the data input of Strip 2, labelled "Data". This connection enables a single control channel of controller 901 to control both LED strips 910. A single control channel is shown coupled from controller 901 to control the LED strips 910, with outgoing control data, in this embodiment converted to a single-ended format used by the Strip 1 and Strip 2 drivers, and re-driven to the Data pad of Strip 1. Returning control data is received from the D-ret pad of Strip 2 and converted to a differential format for transmission to controller 901. In other embodiments, more control channels may be used on a re-driver card.

A pair of LED strips 910 is shown each including LEDs 911, LED drivers 912 and loop-back logic 914. While two LED strips are shown, two or more may be used in various embodiments. For example, an LED panel 750 (FIG. 7) may be constructed with four LED strips coupled to a redriver card as shown. Each LED strips 910 is adapted for mounting along a light panel front cover in an operating position as described above. LED strips 910 are formed using the circuit design of FIG. 2, including a physical series of LEDs and drivers, electrically arranged into an upstream series and a downstream series for control signaling as discussed with respect to FIG. 2. For ease of reference, each driver 912 in the respective upstream series is labelled "Up-stream Driver", and each driver 912 in the respective downstream series is labelled "Down-stream Driver". Each LED driver 912 is coupled to drive a respective LED or set of LEDs 911, which produce the lighting effects. A loop-back control logic circuit 914 is operable to determine if the LED panel is the final LED panel in a series of LED panels, and if so re-route the control signal from the final up-stream driver to the first downstream driver of the respective LED strip 910. Each loop-back logic circuit has outgoing and incoming serial links in both directions as depicted, is configurable to either forward commands in both directions if it is not on the final LED strip in the series, or loop back commands if it is, as further described below. In some embodiments, the loop back logic may be replaced with a simple wire or trace if, during construction or assembly, it is known that the LED strips will be employed in the depicted arrangement of physically parallel but electrically in series including the depicted electrical series of upstream-downstream-up-stream-downstream as depicted and no loop-back logic is needed. For example, an LED strip 910 may be cut to a designated length and a loop back connection installed between the final upstream and downstream control signal pads.

While LED strips 910 are shown positioned in an external light panel 950 in this embodiment, LED strips 910 in various configurations are also employed in one or more of each of accent light devices 502A and 502B in other embodiments, which are coupled to the accent light controller similarly to external light panel 950 allowing configuration and reconfiguration of accent lights in the gaming cabinet and external to the gaming cabinet as further described below. As indicated by the ellipsis, more than one accent light device 502A or 502B are typically used with an accent light controller 901 in various embodiments.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as front, back, upper, lower, right, and left and the like with reference to a given feature are made with reference to the orientation of the light panel and gaming machines and gaming machine installations shown in the drawings.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. An illumination device comprising:

a first substrate;

a plurality of LED drivers arranged in a physical series along the first substrate and coupled to drive a plurality of respective LED pixels, each of the LED drivers including a data input and a data output for communicatively coupling the LED drivers;

communication traces formed along the first substrate and connecting to respective data inputs and data outputs of the LED drivers to electrically arrange the LED drivers into an upstream series comprising a first selected group of the LED drivers and a downstream series comprising the remaining LED drivers, the upstream series and downstream series being interspersed along the physical series;

a proximal upstream terminal pad on the first substrate for connecting an upstream data signal onto the first substrate;

a distal upstream terminal pad on the first substrate for connecting the upstream data signal off of the first substrate;

a proximal downstream terminal pad on the first substrate for connecting a downstream data signal off of the first substrate;

a distal downstream terminal pad on the first substrate for connecting the downstream data signal onto the first substrate; and a loopback circuit operable to determine if the first substrate is a final substrate in a series of substrates, and if so to connect the data output of a final LED driver of the upstream series to the data input an initial LED driver of the downstream series.

2. The illumination device of claim 1 wherein the physical series is a row, and upstream series and downstream series are interspersed by being alternated one-by-one along the row.

3. The illumination device of claim 1 wherein the upstream series and downstream series are interspersed such that no communication trace connecting a data output of one of the LED drivers to a data input of another one of the LED drivers is longer than 50 cm.

4. The illumination device of claim 1 further comprising a positive voltage rail and a negative voltage rail both formed along the first substrate and comprising at least 3 oz-rated copper traces having a width of at least 0.2 inches.

5. The illumination device of claim 1 further comprising at least one additional substrate including LED drivers arranged and coupled like those of the first substrate and connected to the first substrate at least by connection to the distal upstream terminal pad and the distal downstream terminal pad.

6. The illumination device of claim 1 further comprising an electronic controller coupled to the first substrate and programmed to transmit a control signal to the data input of a first LED driver of the upstream series.

7. A light panel adapted to be coupled to a gaming machine cabinet, the light panel comprising:

a light panel housing;

an accent light assembly positioned along the light panel housing and comprising a plurality of LED strips each comprising:

a first substrate;

a plurality of LED drivers arranged in a physical series along the first substrate and coupled to drive a plurality of respective LED pixels, each of the LED drivers including a data input and a data output for communicatively coupling the LED drivers;

communication traces formed along the first substrate and connecting to respective data inputs and data outputs of the LED drivers to electrically arrange the LED drivers into an upstream series comprising a first selected group of the LED drivers and a downstream series comprising the remaining LED drivers, the upstream series and downstream series being interspersed along the physical series;

a proximal upstream terminal pad on the first substrate for connecting an upstream data signal onto the first substrate;

a distal upstream terminal pad on the first substrate for connecting the upstream data signal off of the first substrate;

a proximal downstream terminal pad on the first substrate for connecting a downstream data signal off of the first substrate; and a distal downstream terminal pad on the first substrate for connecting the downstream data signal onto the first substrate; and a loopback circuit operable to determine if the first substrate is a final substrate in a series of substrates, and if so to connect the data output of a final LED driver of the upstream series to the data input an initial LED driver of the downstream series.

8. The light panel of claim 7 wherein the physical series is a row, and upstream series and downstream series are interspersed by being alternated one-by-one along the row.

9. The light panel of claim 7 wherein the upstream series and downstream series are interspersed such that no communication trace connecting a data output of one of the LED drivers to a data input of another one of the LED drivers is longer than 50 cm.

10. The light panel of claim 7 further comprising a positive voltage rail and a negative voltage rail both formed along the first substrate and comprising at least 3 oz-rated copper traces having a width of at least 0.2 inches.

11. The light panel of claim 7 further comprising at least one additional substrate including LED drivers arranged and coupled like those of the first substrate and connected to the first substrate at least by connection to the distal upstream terminal pad and the distal downstream terminal pad.

12. The light panel of claim 7 further comprising an electronic controller coupled to the first substrate and programmed to transmit a control signal to the data input of a first LED driver of the upstream series.

13. The light panel of claim 12 further comprising a redriver card electrically coupled between the electronic controller and at least two of the LED strips for redriving a control signal from the electronic controller.

14. The light panel of claim 13 wherein the redriver card includes two or more power supplies coupled to respective ones of the LED strips.

15. The light panel of claim 7 wherein each LED strip is mounted along a front face of a fin structure of the light panel housing.

* * * * *